May 9, 1961 H. F. MARTIN ET AL 2,983,444

DATA PROCESSING INPUT APPARATUS

Filed July 6, 1959

INVENTORS
HAROLD F. MARTIN
JOHN J. LYNOTT

BY

Baylor G. Riddell
ATTORNEY

United States Patent Office 2,983,444
Patented May 9, 1961

2,983,444

DATA PROCESSING INPUT APPARATUS

Harold F. Martin, San Jose, and John J. Lynott, Los Gatos, Calif., assignors to International Business Machines Corporation, New York, N.Y., a corporation of New York Filed July 6, 1959, Ser. No. 825,108

8 Claims. (Cl. 235—61.11)

This invention relates to data processing input systems and more particularly to a method and apparatus for high speed serial entry of coded characters into data processing machines from original or source documents, such as punched hole accounting cards.

In the art of high speed computer data processing, it has been advantageous in many applications to enter information into the associated computer one character at a time, i.e., "serial by character." In the data processing machine field wherein punched hole accounting cards are employed, the characters appearing thereon are usually represented by a combination of punched hole positions arranged one above the other in columns, each column representing one coded character. The columns are distributed horizontally across the lengthwise dimension of the card. Therefore, to take the information from the accounting card in a "serial by character" fashion so as to enter it into a computer one character at a time, it is necessary to feed the card past a card reading or sensing station with the card's short dimension first so that all punches or "bits" in each column are sensed simultaneously, i.e., "parallel-by-bit." The time required to read any particular card in this "serial-by-character, parallel-by-bit" fashion is obviously dependent upon the time it takes for the lengthwise dimension of the card to pass through the sensing station. On the other hand, if the long dimension of the card is fed into the sensing station first, the transit time of the card therethrough is substantially reduced and card reading speeds are correspondingly increased. In addition, this long edge first ("parallel by character") method of feeding cards has been generally considered to be easier to perform for the reason that in the short edge first, or "serial by character" feeding of cards the edges of the punched holes on adjacent cards in a stack tend to interfere or "hang up" on each other. Further, cards fed "serially by character" have tended to buckle; registration problems have been encountered; and where wires are used to sense elongated punched holes, the wires fall more easily into the lengthwise vertical dimension of the punched holes than into the narrow horizontal dimension thereof. For these reasons, then, it has been generally considered more desirable to feed cards "parallel-by-character" rather than serially.

Even though the preferred parallel card feeding approach is, to a limited extent, incompatible with a "serial-by-character" input requirement of data processing computers, it has nevertheless been maintained and used in computer applications, primarily due to the higher mechanical card-reading speeds obtainable, since speed is crucial in most computer systems. Therefore, the problem in the prior art has been one of adapting the advantages of high speed parallel card feeding to the "serial by character" input requirement of data processing computers.

This problem has been solved in the past generally by one or the other of the following methods: feed the cards in parallel and then change the direction of motion of the card and pass it serially under twelve transducers (there being usually twelve rows of punched hole positions). Due to the required change in direction of card motion, this method is inherently slow, being in the order of 250–300 cards per minute. The other approach employs a parallel (long edge first) feeding of the cards under eighty sensing probes (for an eighty column card) which will simultaneously "read" all the punched holes or "bits" in each row, one row at a time, into a transitory or "buffer" storage, such as a magnetic core storage, until all the information on the card has been placed in storage. From this buffer storage the information may be extracted and entered into an associated computer serially-by-character. Since the buffer storage circuits electronically perform the conversion of the order of characters from parallel to serial to accommodate the computer, the card reading speed achieved by using parallel card feeding methods is advantageously utilized—but at considerable expense. With a magnetic core "storage," for example, this expense includes the cost of many cores, eighty transducers, and associated circuitry.

According to the present invention, each card is fed in parallel (long edge first) using a conventional card feed mechanism. At one point during the feeding of each card, radiant energy is transmitted via the holes punched in the card onto a slowly turning photoresponsive and uniformly precharged drum surface. This exposure of the card holes onto the surface dissipates the uniform charge on the drum in those areas corresponding to the card holes. At the same time a substantial optical reduction in the card size is effected. Further, the drum surface moves at right angles to the direction of the card feeding movement. Thus, each card is reduced and the holes therein are recorded upon the drum in a very small area thereby considerably reducing the dimensions of the card as now represented on the drum. Furthermore, with the card itself moving in one direction while the recorded hole images move at right angles thereto, serial sensing of the images is achieved without employing a change in the direction of physical movement of the cards themselves. In this manner serial reading of each card is done in a fraction of the time that would normally be required if the card itself were being read. In addition, by using the present invention it is not necessary to employ a buffer storage unit as described above, to maintain high speed "serial-by-character" input. Hence, a very high speed "serial-by-character" input to a computer is provided by the present invention. If desired, the resulting signals from the transducers which are reading each row of images may be converted electronically from the code of the card to more suitable codes to be used in the computer.

As a result, the present invention overcomes the speed limitation inherent in the first prior art method described above which required a change of direction of the card's physical movement, and eliminates the expense of a buffer storage as used in the second method, for example, the cost of magnetic cores and sixty eight of the eighty transducers usually employed in a magnetic core buffer storage. Therefore, this invention is considered a substantial improvement over either of the foregoing data processing input methods.

It is therefore, an object of this invention to provide a high speed, simple, and inexpensive, serial-by-character, card reading input system for data processing machines.

It is a more particular object of this invention to provide an inexpensive data processing input system wherein high speed serial-by-character sensing of source documents being fed parallel-by-character is achieved.

The foregoing and other objects, features and advantages of the invention will be apparent from the following more particular description of preferred embodiments of the invention, as illustrated in the accompanying drawings.

Figures 1, 2:
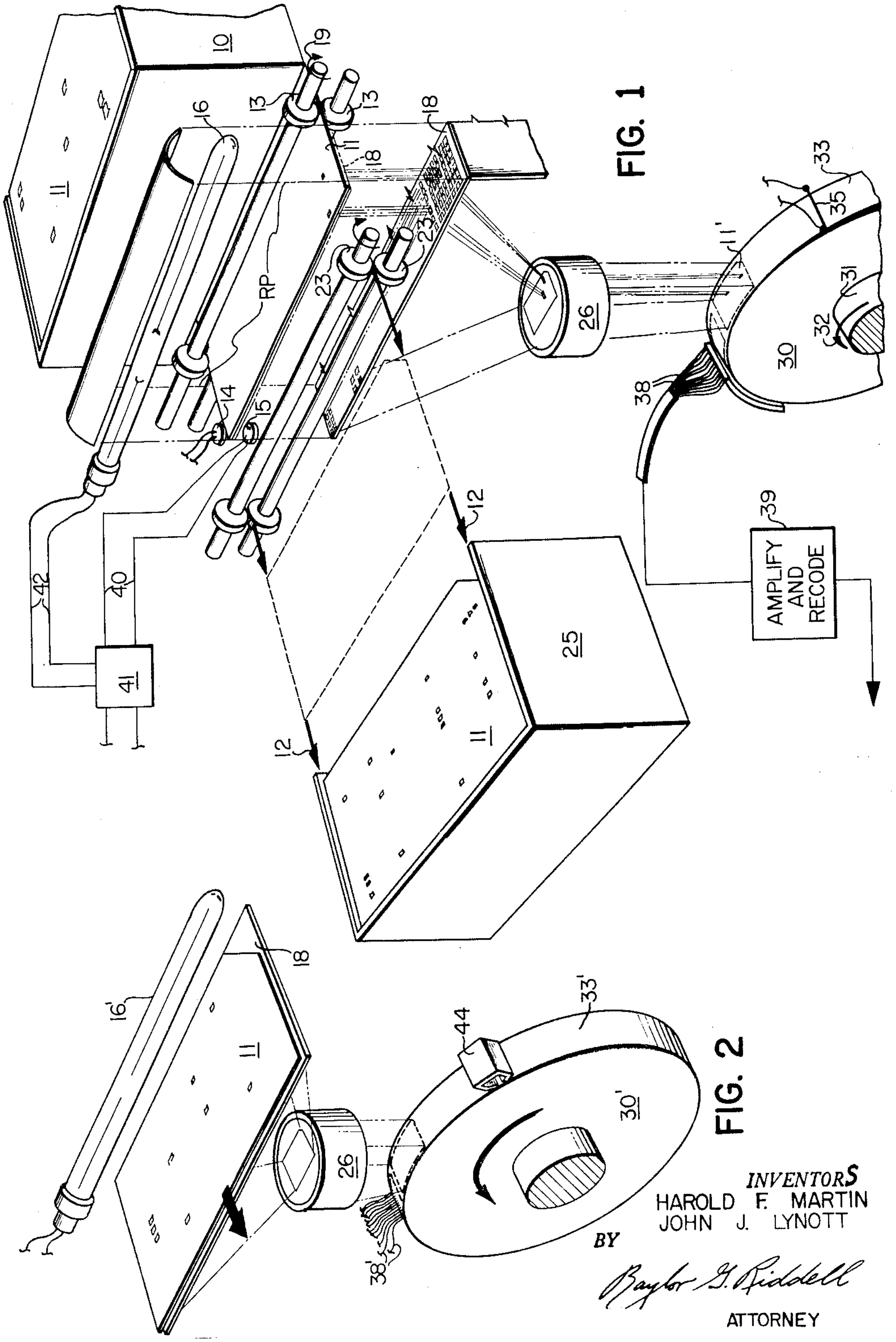
Fig. 1 is a schematic perspective representation of one embodiment of the invention employing an electrostatically chargeable drum surface.
Fig. 2 is a schematic perspective representation of another embodiment of the invention employing a magnetizable drum surface and an infrared source of radiation for selectively de-magnetizing the drum.

Referring to the electrostatic embodiment shown in Fig. 1 there is provided a card feed hopper 10 of ordinary construction which dispenses punched hole accounting cards 11 one-at-a-time, long edge first. Cards 11 are carried along a card feeding path represented generally by arrows 12 by means of friction rollers 13.

As the leading edge of each card 11 reaches a recording position, RP, defined by a light source 14 and a photocell 15 positioned in vertical alignment with respect to each other, the leading edge of card 11 interrupts the passage of light therebetween to energize a projection lamp 16 which is arranged above cards 11 at position RP along path 12, and which is controlled by a control circuit 41. During the time when lamp 16 is energized, card 11 will be resting upon a mask 18 provided therebeneath. In Fig. 1 mask 18 is shown lowered away from its actual position for purposes of clarity, its true position being shown in dotted lines under card 11. Mask 18 functions to provide improved definition for the light passing through the punched holes in card 11 as well as to support card 11 during a portion of its travel along path 12.

Rollers 13 are driven by any suitable means such as a motor represented schematically by arrows 19. A second pair of rollers 23 identical to rollers 13 are provided to pick up card 11 as it traverses path 12 and carry it along. In the embodiment shown, the shafts of rollers 13 and of rollers 23 are parallel and spaced apart along path 12 a distance approximately equal to one card width so that rollers 23 will pick up a card 11 just before rollers 13 have released its trailing edge. Finally, there is provided a second card hopper 25 for receiving the cards at the end of path 12.

Directly beneath mask 18 there has been provided a reducing lens 26 for focussing the light from lamp 16 which passes through the holes of card 11 and onto the surface of a slowly rotating drum 30. The shaft 31 of drum 30 is arranged parallel to card feeding path 12 and is continuously driven to the left as shown in Fig. 1 by a motor schematically represented by arrow 32.

The surface 33 of drum 30 is coated with a photoconductive material such as amorphous selenium which is capable of receiving and holding an electrostatic charge until it is struck by radiant energy. Such a drum surface coating as shown and described in any of a number of U.S. Letters Patent, for example those in the "xerographic recording" art, is suitable for this purpose. Located in close proximity to surface 33 and extending thereacross at a position to the right of lens 26 there has been provided a high voltage corona discharge wire 35 for applying a uniform electrostatic charge of a predetermined polarity to surface 33 as drum 30 rotates. Surface 33 is therefore provided with a uniform photoresponsive field which may be selectively dissipated by the application of radiant energy thereto through the holes in cards 11 when lamp 16 is energized. Energizing lamp 16, therefore, effectively dissipates the field on surface 33 so that variations in the field may be sensed by electrostatic sensing probes 38 reading the card image 11' passing column-by-column therebeneath. Probes 38 may be conventional design, such as a wire having shielding on its sides and which is bare on its end. Signals from probes 38 are then read to suitable amplifying and recording circuitry 39 for utilization in a computer, not shown.

In order to insure proper registration between probes 38 and their respective rows of hole images, photocell 15 is connected by leads 40 to an ordinary control circuit 41 which supplies a pulse to lamp 16 via leads 42 whenever the light passing from source 14 to photocell 15 is interrupted by the presence of a card 11 therebetween. The light and photocell 15 arrangement could be replaced by any of a number of suitable devices for triggering lamp 16 when card 11 has reached a predetermined recording position in path 12. For example, mechanical contacts or brushes could be used.

Referring to Fig. 2, as schematically thereshown, there is provided a magnetic embodiment of the invention along the lines of the embodiment shown in Fig. 1. Similar parts have been designated with a prime mark ('). Lamp 16' in Fig. 2 is a source of infrared radiation. Drum surface 33' is a magnetizable surface which, when magnetized, may be de-magnetized by the application of heat thereto from lamp 16' until the temperature has been raised above its magnetic "Curie point," i.e., until that temperature has been reached which will effectively de-magnetize the previously magnetized surface, 33'. A permanent magnet 44 is provided in close spaced relation to surface 33' so as to apply a uniform magnetic field thereto prior to exposing it to lamp 16'. By energizing lamp 16' infrared radiation is passed only through the holes of a card 11 and thence to surface 33' thereby recording an image of the card on surface 33' by dissipating the magnetic field thereon. As drum 30' continues to rotate counterclockwise, as shown in Fig. 2, the selectively de-magnetized areas representing holes in the exposed card 11, are read by a number of probe type magnetic reading transducers 38' which are well known in the art. As in the electrostatic embodiment, signals from transducers 38' are suitably amplified and utilized.

While the invention has been particularly shown and described with reference to holes punched through cards 11, it will be understood by those skilled in the art that lamp 16 could be arranged to reflect light from the face of other types of cards wherein information is indicated thereon by printed characters, marks, spots, or otherwise. Therefore, it is to be understood that the foregoing and other changes in form and details may be made without departing from the spirit and scope of the invention.

What is claimed is:

1. In an apparatus for reading cards having information indicia recorded thereon in columns arranged side by side across the length thereof, a data processing input device comprising a cyclically moving member having a surface of photoresponsive material, means for feeding in their columnar direction successive cards to a recording position with respect to said moving surface, means for applying a uniform photoresponsive field to said surface, a source of radiant energy, means for passing said radiant energy via the information indicia recorded on each of said cards to said surface after said uniform field has been applied thereto to record successively an image of each of said cards from said position onto said photoresponsive surface, and means for sensing said card images column-by-column as they move thereby.

2. The invention according to claim 1 wherein said energy passing means includes an optical system for effecting a considerable reduction in the size of said images to minimize the time required to sense said images.

3. In an apparatus for reading cards having information indicia recorded thereon in columns arranged side by side across the length thereof, a data processing input device comprising a cyclically moving member having a photoconductive surface thereon, means for feeding in their columnar direction successive cards to a recording position with respect to said moving surface, means for applying a uniform electrostatic field to said surface, a light source, means for passing light from said light source via the information indicia of each one of said cards to said surface after the uniform field has been applied thereto to record an image of each of said cards from said position onto said photoconductive surface, and means for sensing said card images column-by-column as they move thereby.

4. The invention according to claim 3 wherein said light passing means includes an optical system for considerably reducing the size of said images to minimize the time required to sense said images.

5. In an apparatus for reading cards having information indicia recorded thereon in columns arranged side by side across the length thereof, a data processing input device comprising a cyclically moving member having a surface of magnetizable material, means for feeding in their columnar direction successive cards to a recording position with respect to said moving surface, means for uniformly magnetizing said surface, a source of infrared radiant energy, means for passing said radiant energy via the information indicia recorded on each of said cards to said surface after said surface has been uniformly magnetized thereby recording images of said cards from said position onto said surface by selectively de-magnetizing said surface and magnetic means for sensing each of said card images column-by-column as they move thereby.

6. The invention according to claim 5 wherein said energy passing means includes an optical system for considerably reducing the size of said images to minimize the time required to sense said images.

7. A high speed serial-by-character data input system for processing data-bearing source documents wherein said documents have coded data arranged thereon in columns and rows, each character thereon appearing in a discrete column, said input system comprising a member arranged to travel in a direction corresponding to said rows, said member having a radiant energy responsive surface, means for providing the surface of said member with a uniform sensible field, a source of radiant energy, means for projecting said radiant energy upon said surface via each of said documents to selectively dissipate portions of said field to provide an image of each of said documents on said surface, means for feeding a succession of said documents in the direction of said columns to said projection means, and means for reading said images column-by-column in the direction of said rows.

8. A high speed serial-by-character data input system for processing data-bearing source documents wherein said documents have coded data arranged thereon in columns and rows, each character thereon appearing in a discrete column, said input system comprising a member arranged to travel in a direction corresponding to said rows, said member having a radiant energy responsive surface, means for providing the surface of said member with a uniform sensible field, a source of radiant energy, means for projecting said radiant energy upon said surface via each of said documents to selectively dissipate portions of said field to provide an image of each of said documents on said surface, said projection means including means for reducing the size of said images with respect to the size of said documents, means for feeding a succession of said documents in the direction of said columns to said projection means, and means for reading said images column-by-column in the direction of said rows.

No references cited.